Patented May 7, 1929.

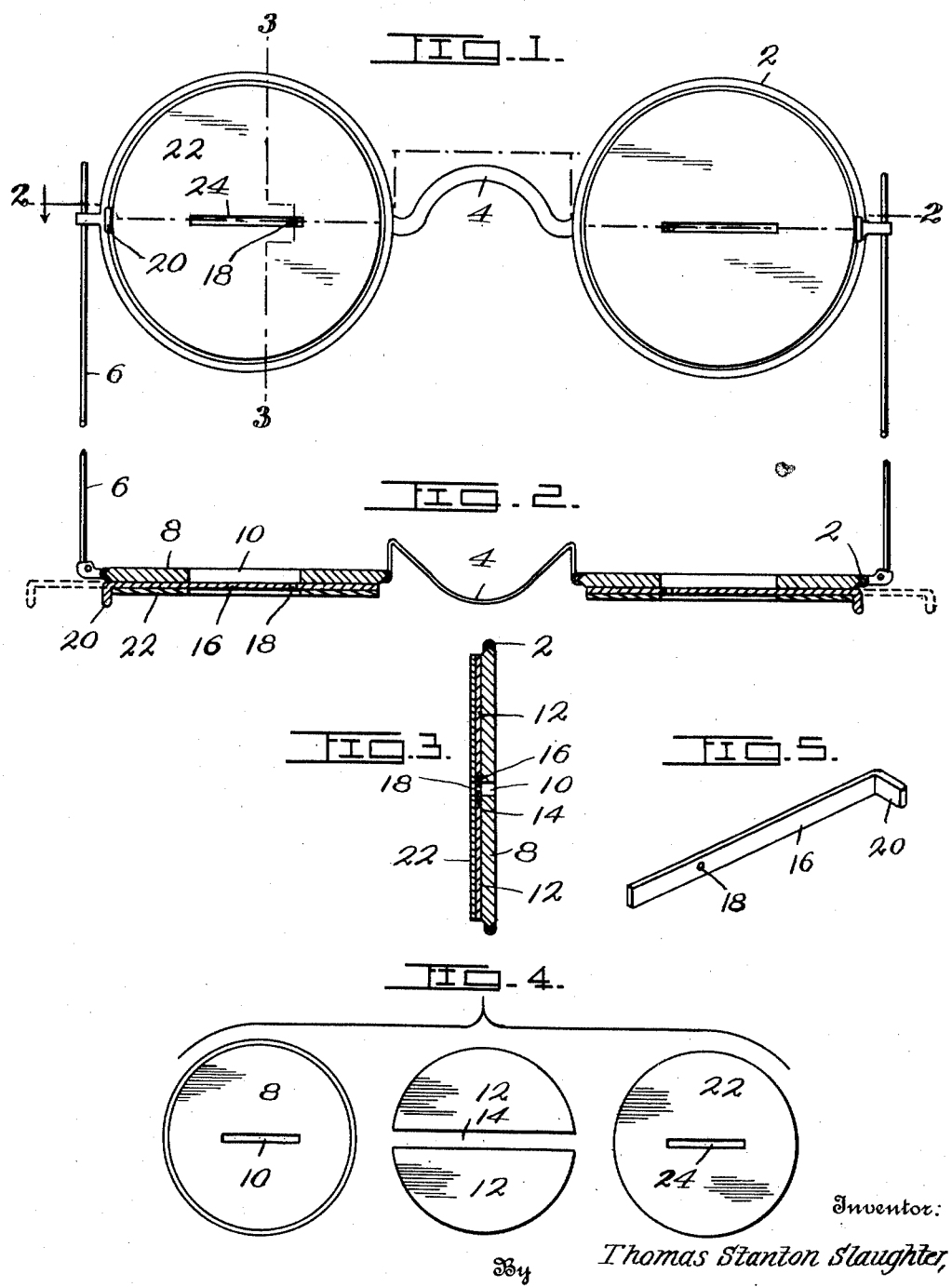

1,712,360

UNITED STATES PATENT OFFICE.

THOMAS STANTON SLAUGHTER, OF KANSAS CITY, MISSOURI.

SPECTACLES.

Application filed October 15, 1927. Serial No. 226,429.

My invention relates to spectacles in which opaque material having peepholes is substituted for the usual lenses in order to protect the eyes from excess light, and in this respect operates on the principle of the peep-sight of a rifle which enables the marksman to see the target much more distinctly than is possible without the aid of such a sight.

A specific object of the invention is the provision of opaque protectors having horizontal slots and slides with peepholes which register with said slots and may be adjusted to register with the pupils of the eyes, so that one size of spectacles may accommodate a number of persons with pupils spaced different distances apart.

In order that the invention may be fully understood, reference will now be had to the accompanying drawing, in which:

Fig. 1 is a front elevation of a pair of spectacles equipped with my invention.

Fig. 2 is a longitudinal section on line 2—2 of Fig. 1.

Fig. 3 is a vertical cross section on line 3—3 of Fig. 1.

Fig. 4 shows the different elements which go to make up one of the devices.

Fig. 5 is a detail perspective view of one of a pair of slides employed in carrying out the invention.

In carrying out the invention I employ a spectacle frame of any desired type of construction and in the present instance have shown a frame consisting of a pair of rims 2, a bridge 4 uniting said rims 2, and bows 6 hinged or otherwise operably connected to the rims 2.

Referring more particularly to the devices constituting my invention, 8 designates an element made of light-resisting material, preferably of opaque material such, for instance, as insulating fiber, metal, rubber, or celluloid. The elements 8 are fitted into the rims 2 and have longitudinal slots 10 of suitable length. The front surface of each element 8 is provided with a pair of members 12 preferably of the same material, but somewhat thinner than the element 8. Each member 12 is slightly less than half the size of the associate element 8 and said members 12 are spaced apart to leave a horizontal opening 14 which registers with the slot 10 and is adapted to receive a slide 16 preferably of equal length to said elements 12. The slide 16 has a peephole 18 which registers with the slot 10 and said slide is provided at one end with a forwardly turned knob or handle 20 whereby it may be grasped and slid longitudinally in either direction for properly positioning the peephole 18 with respect to the pupil of the eye.

The members 12 are assisted in holding the slides 16 in the openings 14 by means of the elements 8 and a pair of elements 22. The elements 22 are preferably of the same material as the elements 8 and 12, to which latter they are cemented or otherwise fixedly secured. Each element 22 has a longitudinal slot 24 which registers with the respective slot 10 and opening 14.

As shown by Figs. 2 and 3, the elements 8 are thicker than the elements 12 and 22. This is for the purpose of holding the slides 16 in advance of the spectacle rims 2 so that said slides may be adjusted towards or away from each other without contacting with the respective rims.

With the spectacles equipped as herein shown and described, a person is enabled to read newspapers and other printed matter to better advantage than without the aid of said devices, as the latter exclude the noneffective light and permit the pupils of the eyes to focus or concentrate upon the subject-matter being read. Likewise said devices will protect the eyes from snow glare, sunlight, and other strong light having detrimental effect upon the vision.

The adjustability of the slides 16 permits economical manufacture of the devices in one size as each purchaser may adjust the peepholes to his individual requirements.

The spectacles are also very useful in observing aeroplanes and moving pictures as they reduce the flicker and consequent eye strain.

While I have shown a preferred embodiment of the invention, I reserve the right to make all such changes and modifications thereof as properly fall within the spirit and scope of the invention as claimed.

Having thus described my invention, what I claim and desire to secure by Letters Patent, is:

1. In a device of the character described, a light-obstructing element having a slot therein, two members spaced apart upon said element to leave an opening paralleling said slot, a slide operably mounted between said members to cover the slot and provided with a peephole which registers with said slot, and a second element fixed upon said members and provided with a slot which registers with the first-mentioned slot.

2. In combination with a spectacle frame having a pair of oppositely-disposed rims, an element having a slot therein, two members spaced apart upon said element to leave an opening paralleling said slot, a light-obstructing element fixed upon said members and provided with a slot which registers with the first-mentioned slot, and a slide operably mounted between the first and last-mentioned elements and in the opening between said members.

In testimony whereof I affix my signature.

THOMAS STANTON SLAUGHTER.